(12) United States Patent
Masuda et al.

(10) Patent No.: US 6,248,819 B1
(45) Date of Patent: Jun. 19, 2001

(54) THERMOSETTING WATER-BORNE COATING COMPOSITION, METHOD OF FORMING A COATING FILM USING SAME, AND METHOD OF FORMING A MULTILAYER COATING FILM

(75) Inventors: Kazuaki Masuda; Hiroharu Ohsugi; Teruaki Kuwajima, all of Osaka; Tsuyoshi Harakawa, Kyoto, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/562,642

(22) Filed: May 1, 2000

(30) Foreign Application Priority Data

Apr. 30, 1999 (JP) .................................. 11-124008
Feb. 25, 2000 (JP) .................................. 12-049321

(51) Int. Cl.$^7$ ........................................ C08K 5/29
(52) U.S. Cl. ............................................. 524/195
(58) Field of Search ................................. 524/195

(56) References Cited

U.S. PATENT DOCUMENTS 4,910,339   3/1990   Henning et al. .
5,859,166   1/1999   Sasaki et al. .

FOREIGN PATENT DOCUMENTS 0 792 908 A1   9/1997   (EP) .
WO 99/06460 A1   2/1999   (WO) .

Primary Examiner—Paul R. Michl
(74) Attorney, Agent, or Firm—Sughrue, Mion, Zinn, Macpeak & Seas, PLLC

(57) ABSTRACT

A thermosetting water-borne coating composition which, when used as a water-borne coating, have both sufficient curability and sufficient storage stability and provides coating films excellent in water resistance, a method of forming a coating film using the same and a method of forming a multilayer coating film using the same are provided.

The coating composition comprises a polycarbodiimide compound modified for hydrophilicity and a carboxyl-containing aqueous resin composition, wherein the polycarbodiimide compound has a structure such that a carbodiimide unit and a polyol unit occur alternately via a urethane bond and repeatedly and a hydrophilic unit occurs at both molecular termini and is bound to a carbodiimide unit via a urethane bond.

20 Claims, No Drawings

US 6,248,819 B1

THERMOSETTING WATER-BORNE COATING COMPOSITION, METHOD OF FORMING A COATING FILM USING SAME, AND METHOD OF FORMING A MULTILAYER COATING FILM

FIELD OF THE INVENTION

The present invention relates to a thermosetting water-borne coating composition excellent in storage stability and capable of providing coating films excellent in workability, a method of forming a coating film using the same, and a method of forming a multilayer coating film.

PRIOR ART

It is a recent trend to use water-borne coatings, in place of solvent-borne coatings, as coatings for automobile or motor-cycle or its parts where the substrates to be coated are metals.

As such water-borne coatings so far disclosed, there may be mentioned, among others, the one whose basis is an aqueous dispersion containing a finely divided crosslinked polymer and showing pseudoplasticity or thixotropy (Japanese Kokai Publication Hei-02-97564), the one which contains a polyether-polyurethane dispersion and an intercalation compound as a viscosity modifier (Japanese Kokai Publication Hei-02-55720), the one which contains the product of polymerization of an acrylic monomer in the presence of a polyester resin and a polyurethane dispersion (Japanese Kokai Publication Sho-63-51471), and the one which contains an amido-containing acrylic resin and a urethane-containing aqueous dispersion (Japanese Kokai Publication Hei-06-233965).

Furthermore, in recent years, plastic materials have also been used as articles or substrates to be coated from the light weight and/or easy molding viewpoint. A water-borne base coat has been disclosed as a coating for such articles or substrates not so high in heat resistance. According to Japanese Kokai Publication Hei-02-289630, for instance, such coating comprises an aqueous acrylic resin and a polyurethane resin-based emulsion.

However, these water-borne coatings, when dryed at ordinary temperature or baked at relatively low temperature not higher than 120° C., show insufficient curability. Even when baked at a high temperature exceeding 120° C., they sometimes show reduced coating film performance characteristics, for example reduced water resistance, due to carboxyl groups remaining in coating films.

As regards other water-borne coatings differing from those mentioned above, Japanese Kokai Publication Sho-62-72742 and Japanese Kokai Publication Hei-05-271611 disclose carbodiimide compounds which can be used in aqueous systems and thermosetting water-borne coating compositions containing them. However, the coating films obtained by using these coatings are insufficient in solvent resistance and the water-borne coatings themselves have a problem with their storage stability, although it has been proved that the water resistance of said coating films is improved as a result of disappearance of carboxyl groups by their reacting with carbodiimide groups.

Accordingly, it is an object of the present invention to provide a thermosetting water-borne coating composition showing a balance between sufficient curability and sufficient storage stability and giving coating films having good water resistance and a method of forming a coating film using said composition as well as a method of forming a multilayer coating film.

SUMMARY OF THE INVENTION

The present invention provides a thermosetting water-borne coating composition comprising a polycarbodiimide compound modified for hydrophilicity and a carboxyl-containing aqueous resin composition, wherein the polycarbodiimide compound modified for hydrophilicity has a structure such that a carbodiimide unit and a polyol unit occur alternately via a urethane bond and repeatedly and a hydrophilic unit occurs at both molecular termini and is bound to such carbodiimide unit via a urethane bond. The number of repetitions of the carbodiimide unit and polyol unit is preferably 1 to 10.

Said carbodiimide unit is, for example, obtainable from a polycarbodiimide compound (a) having at least two isocyanato groups within each molecule by removal of the isocyanato groups, said polyol unit is obtainable from a polyol (b) having at least two hydroxy groups within each molecule by removal of the active hydrogen atoms, and said hydrophilic unit is obtainable from a modifier for hydrophilicity (c) having an active hydrogen atom and a hydrophilic moiety by removal of the active hydrogen atom.

The modifier for hydrophilicity (c) is preferably a monoalkoxy-polyalkylene glycol, more preferably one in which an alkoxy moiety contains 4 to 20 carbon atoms.

Furthermore, it is preferred that the mole ratio of the total number of carboxyl groups within said water-borne coating composition to the total number of carbodiimide groups within said polycarbodiimide compound modified for hydrophilicity is 1/0.05 to 1/3.

The above thermosetting water-borne coating composition may further comprise a coloring component.

The invention also provides a method of forming a coating film comprising applying the thermosetting water-borne coating composition defined above to the surface of an article or substrate to be coated and curing the resulting water-borne coat by heating.

The invention further provides a method of forming a multilayer coating film comprising applying a clear coating to the surface of the coating film obtainable by the above method of forming a coating film and curing the resulting clear coat by heating, or comprising the step (1) of applying a thermosetting water-borne coating composition to the surface of an article or substrate to be coated to thereby provide a water-borne coat, the step (2) of applying a clear coating onto the water-borne coat to provide a clear coat, and the step (3) of curing both coats obtainable by the steps (1) and (2) simultaneously by heating, wherein said thermosetting water-borne coating composition is defined as mentioned above.

The above step (1) may comprise applying a thermosetting water-borne coating composition, followed by heating, to provide a water-borne coat.

Furthermore, the invention provides a method for producing a polycarbodiimide compounds modified for hydrophilicity which comprises the step (1) of reacting a polycarbodiimide compound (a) having at least two isocyanato groups within each molecule with a polyol (b) having hydroxy groups at molecular termini in a mole ratio such that the number of moles of the isocyanato groups of the polycarbodiimide compound (a) is in excess of the number of moles of the hydroxy groups of the polyol (b) and the step (2) of reacting the reaction product obtainable in the above step with a modifier for hydrophilicity (c) having an active hydrogen atom and a hydrophilic moiety.

The modifier for hydrophilicity (c) may be a monoalkoxy-polyalkylene glycol. The monoalkoxy group of the monoalkoxy-polyalkylene glycol preferably contains 4 to 20 carbon atoms. Further, the polyol preferably has a number average molecular weight of 300 to 5,000.

The present invention is directed to a polycarbodiimide compound modified for hydrophilicity as obtainable by the above production process. The polycarbodiimide compound modified for hydrophilicity has a structure such that a carbodiimide unit and a polyol unit occur alternately via a urethane bond and repeatedly and a hydrophilic unit occurs at both molecular termini and is bound to such carbodiimide unit via a urethane bond. The number of repetitions of the carbodiimide unit and polyol unit is preferably 1 to 10.

The carbodiimide unit is, for example, obtainable from a polycarbodiimide compound (a) having at least two isocyanato groups within each molecule by removal of the isocyanato groups, said polyol unit is obtainable from a polyol (b) having at least two hydroxy groups within each molecule by removal of the active hydrogen atoms, and the hydrophilic unit is obtainable from a modifier for hydrophilicity (c) having an active hydrogen atom and a hydrophilic moiety by removal of the active hydrogen atom. The modifier for hydrophilicity (c) is preferably a monoalkoxy-polyalkylene glycol, more preferably one in which the alkoxy group contains 4 to 20 carbon atoms.

DETAILED DESCRIPTION OF THE INVENTION

Thermosetting Water-borne Coating Composition

The thermosetting water-borne coating composition of the present invention comprises a polycarbodiimide compound modified for hydrophilicity and a carboxyl-containing aqueous resin composition and wherein the polycarbodiimide compound modified for hydrophilicity has a structure such that a carbodiimide unit and a polyol unit occur alternately via a urethane bond and repeatedly and a hydrophilic unit occurs at both molecular termini and is bound to such carbodiimide unit via a urethane bond.

The carbodiimide unit constituting the polycarbodiimide compound modified for hydrophilicity within the thermosetting water-borne coating composition of the invention is, for example, obtainable from a polycarbodiimide compound (a) having at least two isocyanato groups within each molecule by removal of the isocyanato groups. This is represented by the formula —$R^1$(—N=C=N—$R^1$)$_n$— (in the formula, $R^1$ is a saturated or unsaturated hydrocarbon group, which may optionally contain a nitrogen atom and/or an oxygen atom and n is the degree of polymerization and is a natural number of 1 to 20).

From the reactivity viewpoint, the above polycarbodiimide compound (a), which has at least two isocyanato groups within each molecule, is preferably a carbodiimide compound having an isocyanato group at both termini. The method of producing carbodiimide compounds having an isocyanato group at both termini is well known to those skilled in the art and can utilize, for example, the condensation reaction, under carbon dioxide elimination, of an organic diisocyanate.

The organic diisocyanate may be an aromatic diisocyanate, an aliphatic diisocyanate, an alicyclic diisocyanate, or a mixture thereof. As specific examples, there may be mentioned 1,5-naphthylene diisocyanate, 4,4'-diphenylmethanediisocyanate, 4,4'-diphenyldimethylmethanediisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophoronediisocyanate, dicyclohexylmethane-4,4'-diisocyanate, methylcyclohexanediisocyanate, tetramethylxylylene diisocyanate and the like.

The above condensation reaction is generally carried out in the presence of a carbodiimidation catalyst. As specific examples of the carbodiimidation catalyst, there may be mentioned phospholene oxides such as 1-phenyl-2-phospholene-1-oxide, 3-methyl-2-phospholene-1-oxide, 1-ethyl-2-phospholene 1-oxide, 3-methyl-1-phenyl-2-phospholene-1-oxide and 3-phospholene isomers of these, among others. From the reactivity viewpoint, however, 3-methyl-1-phenyl-2-phospholene-1-oxide is preferred.

The polyol unit constituting the polycarbodiimide compound modified for hydrophilicity within the thermosetting water-borne coating composition of the present invention is, for example, obtainable from a polyol (b) having at least two hydroxy groups within each molecule by removal of the active hydrogen atoms.

The above polyol (b) is not particularly restricted but, from the reaction efficiency viewpoint, it is preferred that its number average molecular weight be 300 to 5,000. Specifically, such polyol (b) includes polyether diols, polyester diols and polycarbonate diols. Typical examples are polyalkylene glycols such as polyethylene glycol, polypropylene glycol, polyethylene-propylene glycol, polytetramethylene ether glycol, polyhexamethylene ether glycol and polyoctamethylene ether glycol, polyester diols such as polyethylene adipate, polybutylene adipate, polyhexamethylene adipate, polyneopentyl adipate, poly-3-methylpentyl adipate, polyethylene/butylene adipate and polyneopentyl/hexyl adipate, polylactone diols such as polycaprolactone diol, poly-3-methylvalerolactone diol, polycarbonate diols such as polyhexamethylene carbonate diol, and mixtures thereof.

The above carbodiimide unit and polyol unit, which constitute the polycarbodiimide compound modified for hydrophilicity within the thermosetting water-borne coating composition of the present invention, occur alternately via a urethane bond represented by —NH—CO— and repeatedly. The number of the repetitions is not particularly restricted but, from the reaction efficiency viewpoint, it is preferably 1 to 10.

Furthermore, the polycarbodiimide compound modified for hydrophilicity within the thermosetting water-borne coating composition of the invention has a hydrophilic unit at both molecular termini, and is bound to said carbodiimide unit via said urethane bond.

The hydrophilic unit constituting the polycarbodiimide compound modified for hydrophilicity within the thermosetting water-borne coating composition of the invention is obtainable from the modifier for hydrophilicity (c) having an active hydrogen atom and a hydrophilic moiety by removal of the active hydrogen atom.

As the modifier for hydrophilicity (c), there may be mentioned quaternary salts of dialkylamino alcohols represented by ($R^2$)$_2$N—$R^3$—O—H (in which $R^2$ is a lower alkyl group and $R^3$ is an alkylene, polyalkylene or oxyalkylene group each having 1 to 10 carbon atoms), quaternary salts of dialkylaminoalkylamines represented by $(R^2)_2N—R^3—NH_2$ (in which $R^2$ and $R^3$ are as defined above), alkylsulfonic acid salts containing at least one reactive hydroxy group and represented by $H—O—R^4—SO_3—R^5$ (in which $R^4$ is an alkylene group containing 1 to 10 atoms and $R^5$ is an alkali metal atom), monoalkoxy-polyalkylene glycols such as poly(ethylene oxide) or poly(propylene oxide) terminally blocked with a monoalkoxy group as represented by $R^6—O—(CH_2—CHR^7—O—)_m—H$ (in which $R^6$ is an alkyl group containing 1 to 20 atoms, $R^7$ is a hydrogen atom or a methyl group and m is an integer of 4 to 30), and mixtures thereof, and the like. From the viewpoint of water resistance of coating films obtained, the above monoalkoxy-polyalkylene glycols are preferred. From the storage stability viewpoint, the number of carbon atoms within $R^6$ of the monoalkoxy-polyalkylene glycols is preferably 4 to 20, more preferably 8 to 12. From the viewpoint of water dispersibility, it is preferred that $R^7$ be a hydrogen atom. Furthermore, from the viewpoint of water dispersibility and reactivity after volatilization of water, the integer m is preferably 4 to 20, more preferably 6 to 12. The number of carbon atoms in $R^6$ and the value of m in the above unit can adequately be selected within the above respective ranges while taking into consideration the storage stability, water dispersibility and the reactivity after volatilization of water.

As the above monoalkoxy-polyalkylene glycols, there may specifically be mentioned, among others, poly(oxyethylene) monomethyl ether, poly(oxyethylene) mono-2-ethylhexyl ether and poly(oxyethylene) monolauryl ether.

The carboxyl-containing aqueous resin composition within the thermosetting water-borne coating composition of the present invention is not particularly restricted but includes aqueous dispersions or solutions of a carboxyl-containing resin neutralized with a neutralizing agent.

The acid value of the resin solid as resulting from the carboxyl groups of the carboxyl-containing resin is not particularly restricted but, from the viewpoint of storage stability and water resistance of the coating film, it is preferably 2 to 200. In particular when the above resin is used in the form of aqueous dispersions, the acid value of the resin solid is more preferably 2 to 30. When it is used in water-soluble form, the acid value of the resin solid is more preferably 20 to 200. The hydroxy value of the resin solid is not particularly restricted but, from the storage stability viewpoint, it is preferably 10 to 300, more preferably 20 to 200.

The above neutralizing agent is not particularly restricted but includes, among others, organic amines such as momomethylamine, dimethylamine, trimethylamine, triethylamine, diisopropylamine, monoethanolamine, diethanolamine and dimethylethanolamine, and inorganic bases such as sodium hydroxide, potassium hydroxide and lithium hydroxide. The degree of neutralization is not particularly restricted but can judiciously be selected according to the molecular weight and acid value of the resin and is, for example, 20 to 120%.

The above carboxyl-containing resin is not particularly restricted but may be, for example, a carboxyl-containing polyester resin, acrylic resin or polyurethane resin.

The carboxyl-containing polyester resin can be prepared by condensation in the conventional manner.

The carboxyl-containing polyester resin is produced from an alcohol component and an acid component. The polyester resin so referred to herein includes the so-called alkyd resins as well.

As the above alcohol component, there maybe specifically mentioned those having two or more hydroxy groups within each molecule, such as triols such as trimethylolpropane and hexanetriol, and diols such as propylene glycol, neopentyl glycol, butylene glycol, hexylene glycol, octylene glycol, 1,6-hexanediol, 1,8-octanediol, 1,9-nonanediol, 1,10-decanediol, 1,12-dodecanediol, 1,2-cyclohexanediol, 1,3-cyclohexanediol, 1,4-cyclohexanediol, hydrogenated bisphenol A, caprolactone diol and bishydroxyethyltaurine. The above alcohol component may comprise two or more species.

The above acid component specifically includes those having two or more carboxyl groups within each molecule, for example aromatic dicarboxylic acids such as phthalic acid and isophthalic acid, aliphatic dicarboxylic acids such as adipic acid, azelaic acid and tetrahydrophthalic acid, and tricarboxylic acids such as trimellitic acid. Furthermore, mention may be made of long-chain fatty acids such as stearic acid, lauric acid and like ones, oleic acid, myristic acid and like unsaturated ones, natural fats or oils such as castor oil, palm oil and soybean oil and modifications thereof. The above acid component may comprise two or more species.

Furthermore, as the one having a hydroxyl group(s) and a carboxyl group(s) within each molecule, there may be mentioned hydroxycarboxylic acids such as dimethylolpropionic acid and the like.

In cases where the polyester resin obtained has hydroxy groups, the whole or part thereof may be modified with an acid anhydride, such as phthalic anhydride, succinic anhydride, hexahydrophthalic anhydride or trimellitic anhydride, so that the resin may have carboxyl groups.

The above carboxyl-containing acrylic resin can be obtained in the conventional manner, specifically by solution or emulsion polymerization.

For example, the carboxyl-containing acrylic resin can be obtained from a carboxyl-containing ethylenically unsaturated monomer and another ethylenically unsaturated monomer.

The carboxyl-containing ethylenically unsaturated monomer specifically includes acrylic acid, methacrylic acid, ethacrylic acid, crotonic acid, maleic acid, fumaric acid, itaconic acid, half esters thereof such as maleic acid ethyl ester, fumaric acid ethyl ester and itaconic acid ethyl ester, succinic acid mono (meth) acryloyloxyethyl ester, phthalic acid mono(meth)acryloyloxyethyl ester and the like. The carboxyl-containing ethylenically unsaturated monomer may comprise two or more species.

The other ethylenically unsaturated monomer specifically includes hydroxy-containing ethylenically unsaturated monomers such as 2-hydroxyethyl acrylate, 2-hydroxyethyl methacrylate, 4-hydroxybutyl acrylate, 4-hydroxybutyl methacrylate and products derived therefrom by reaction with lactones, amide-containing ethylenically unsaturated monomers such as acrylamide, methacrylamide, N-isopropylacrylamide, N-butylacrylamide, N,N-dibutylacrylamide, hydroxymethylacrylamide, methoxymethylacrylamide and butoxymethylacrylamide and like (meth)acrylamides and, further, nonfunctional ethylenically unsaturated monomers such as styrene, α-methylstyrene, acrylate esters (e.g. methyl acrylate, ethyl acrylate, butyl acrylate, 2-ethylhexyl acrylate) and methacrylate esters (e.g. methyl methacrylate, ethyl methacrylate, butylmethacrylate, isobutylmethacrylate, tert-butyl methacrylate, 2-ethylhexyl methacrylate, lauryl methacrylate), and so forth. The above other ethylenically unsaturated monomer may comprise two or more species.

The above carboxyl-containing acrylic resin may further comprise a non-water-soluble resin as a starting material thereof. The non-water-soluble resin is not particularly restricted but specifically includes, among others, those polyester resins, polyether resins, polycarbonate resins, polyurethane resins, epoxy resins, polyolefins, and polymers and copolymers having a polysiloxy moiety and having a solubility not more than 1 g of resin in 100 g of water.

By incorporating such a non-water-soluble resin as a raw material in the above carboxyl-containing acrylic resin composition, it is possible to improve the physical properties of the coating films obtained. In this case, it is preferred that the ratio of the weight of the carboxyl-containing ethylenically unsaturated monomer and other ethylenically unsaturated monomer to the weight of the non-water-soluble resin solids be 90/10 to 5/95. When the above ratio is less than 5/95, the dispersion stability of the coating and the curability of the coating film may possibly decrease. When it is in excess of 90/10, the physical properties of the coating films obtainedmaybe improved only to an unsatisfactory extent.

By incorporating a polymer or copolymer having a polysiloxy moiety as the non-water-soluble resin, it is possible to improve the water resistance of the coating film obtained. In this case, it is preferred that the ratio of the weight of the carboxyl-containing ethylenically unsaturated monomer and other ethylenically unsaturated monomer to the solids weight of the polymer or copolymer having a polysiloxy moiety be 97/3 to 60/40. When the above ratio is less than 60/40, the dispersion stability of the coating may possibly decrease. When it is in excess of 97/3, the water resistance of the coating film obtained may be improved only to an unsatisfactory extent.

For obtaining the desired resin by emulsion polymerization, specifically a carboxyl-containing ethylenically unsaturated monomer, another ethylenically unsaturated monomer and an emulsifier are subjected to polymerization in water. As specific examples of the carboxyl-containing ethylenically unsaturated monomer and of the other ethylenically unsaturated monomer, there may be mentioned those already mentioned hereinabove. The emulsifier is not particularly restricted but may be any of those well known to the a skilled person in the art.

The carboxyl-containing polyurethane resin mentioned above can be produced, for example, by reacting a compound having an isocyanato group at both termini and a compound having two hydroxy groups and at least one carboxyl group.

The compound having an isocyanato group at both termini can be prepared, for example, by reacting a hydroxy-terminated polyol and a diisocyanate compound. As the hydroxy-terminated polyol and as the diisocyanate, there may be mentioned those polyols (b) and those organic diisocyanate compounds which have been mentioned hereinabove with respect to the carbodiimide compound modified for hydrophilicity. The compound having two hydroxy groups and at least one carboxyl group is, for example, dimethylolacetic acid, dimethylolpropionic acid or dimethylolbutyric acid.

The thermosetting water-borne coating composition of the present invention may comprise two or more species of the carboxyl-containing resin.

The mole ratio of the total number of carboxyl groups within the thermosetting water-borne coating composition to the total number of carbodiimide groups within the polycarbodiimide compound modified for hydrophilicity is 1/0.05 to 1/3, more preferably 1/0.05 to 1/2. When the above mole ratio is less than 1/3, the effects obtained may not be proportional to the addition amount. When it is in excess of 1/0.05, the reaction may not proceed to a sufficient extent, so that the water resistance and/or physical properties of the coating films obtained may deteriorate.

The thermosetting water-borne coating composition of the present invention can further contain an auxiliary crosslinking agent corresponding to the functional group within the carboxyl-containing aqueous resin composition. When, for example, the carboxyl-containing aqueous resin composition is a hydroxy-containing one, the auxiliary crosslinking agent may be an amino resin or (blocked) polyisocyanate, for instance. It may comprise a single species or two or more species. As specific examples of the amino resin, there may be mentioned alkoxylated melamine-formaldehyde or paraformaldehyde condensation products, for example condensation products from an alkoxylated melamine-formaldehyde such as methoxymethylolmelamine, isobutoxymethylolmelamine or n-butoxymethylolmelamine, as well as such commercial products as Cymel 303 (product of Mitsui Cytec). As specific examples of the above (blocked) polyisocyanate compound, there may be mentioned polyisocyanates such as trimethylene diisocyanate, hexamethylene diisocyanate, xylylene diisocyanate and isophoronediisocyanate, and derivatives thereof obtained by addition of an active hydrogen-containing blocking agent such as an alcohol compound or an oxime compound and capable of regenerating an isocyanato group by dissociation of the blocking agent upon heating. The content of the auxiliary crosslinking agent is not particularly restricted but may adequately be selected by the one having an ordinary skill in the art according to the functional group value of the carboxyl-containing aqueous resin composition, the auxiliary crosslinking agent species and so forth.

The thermosetting water-borne coating composition of the present invention may contain a coloring component. The coloring component includes, among others, luster color pigments such as aluminum flakes, mica-like iron oxide, mica flakes, metal oxide-coated mica-like iron oxide and metal oxide-coated mica flakes, inorganic color pigments such as titanium oxide, iron oxide, chromium oxide, lead chromate and carbon black, organic color pigments such as phthalocyanine blue, phthalocyanine green, carbazole violet, anthrapyrimidine yellow, flavanthrone yellow, isoindoline yellow, indanthrone blue and quinacridone violet, and dyes such as 1:2 chromium complex black, 1:2 chromium complex yellow and 1:2 cobalt complex yellow.

The content of the coloring component is, for example, 5 to 150% by weight, preferably 5 to 100% by weight, relative to the resin solids weight in the thermosetting water-borne coating composition.

The thermosetting water-borne coating composition of the present invention may further contain, where necessary, a resin in particle form, an extender pigment, a surface modifier, an antifoaming agent, a pigment dispersing agent, a plasticizer, a film forming aid, an ultraviolet absorber, an antioxidant, an organic solvent and/or the like.

The resin in particle form is not particularly restricted but may be those obtained by emulsion polymerization of an ethylenically unsaturated monomer(s) using an amphoteric surfactant as the emulsifier. Such resin in particle form may be a resin in particle form which comprises uncrosslinked particles or a resin in particle form which comprises crosslinked particles, which can be obtained by emulsion polymerization of an acrylic monomer containing an ethylenically unsaturated monomer having two or more radical-polymerizable unsaturated groups within each molecule or two or more ethylenically unsaturated monomers crosslinkable with each other, for example a combination of a carboxyl-containing ethylenically unsaturated monomer and an epoxy-containing ethylenically unsaturated monomer. Such resin in particle form may also be one called core/shell type resin in particle form as obtained by a two-step process.

The mean particle size of the above resin in particle form is not particularly restricted but, from the viewpoint of storage stability and coating film appearance, it is preferably 0.01 to 10 μm, more preferably 0.01 to 5 μm.

The extender pigment, surface modifier, antifoaming agent, pigment dispersing agent and others are not particularly restricted but may be those well known in the art to be capable of being incorporated in thermosetting water-borne coating compositions. They may have a carboxyl group within the molecule.

The thermosetting water-borne coating composition of the present invention can be produced by any method well known to the one having an ordinary skill in the art using the above components as raw materials.

Method of Forming a Coating Film

The method of forming a coating film according to the present invention comprises applying the above thermosetting water-borne coating composition to the surface of a substrate or article to be coated and then heating the thus-obtained water-borne coat. The method of forming a coating film according to the present invention uses the above thermosetting water-borne coating composition and, even when the baking temperature is relatively low, curing is possible.

The above substrate or article to be coated is not particularly restricted but may be, for example, a metallic material or plastic material. The metallic material specifically includes iron panels, steel panels and aluminum panels, among others. The plastic material specifically includes polyurethanes, polycarbonates, polybutylene terephthalate, polyamides, polyphenylene oxide, acrylonitrile/butadiene/styrene copolymers (ABS resins), polypropylene and unsaturated polyesters (SMC). These materials may be surface-treated.

In the coating film forming method of the invention, the surface of a substrate or article to be coated may have an undercoat film or intermediate coating film according to the intended purpose of use thereof. For example, when the substrate is an automotive part, an undercoat film and an intermediate coating film are formed on the surface thereof and, when it is an automotive body, an intermediate coating film is formed thereon. Apart from these, when the coating film forming method of the invention is applied for the purpose of repairing already occurring coating films, the above coated substrate surface is provided with a topcoat film.

The undercoat film is formed to provide the material surface with hiddenness, corrosion resistance and rust resistance. The undercoat for forming such undercoat films is not particularly restricted but includes those well known in the art, for example cationic or anionic electrodeposition coatings.

Intermediate coating films are formed on the above undercoat films to provide the undercoat films with hiddenness, adhesiveness and, further, antichipping property. The intermediate coating for forming the intermediate coating films is not particularly restricted but includes those well known in the art, such as solvent-borne intermediate coatings, water-borne intermediate coatings and powder intermediate coatings. The above intermediate coating includes those called primers or sealers.

Further, the above topcoat film is formed on the above undercoat or intermediate coating films to provide them with good appearance and various functions. The topcoat for forming the topcoat films is not particularly restricted but includes those well known in the art, such as solvent-borne topcoat coat coatings, water-borne topcoats and powder topcoats. The topcoat may be the above thermosetting water-borne coating.

According to the coating film forming method of the invention, the above thermosetting water-borne coating composition is applied to the surface of the substrate or article to a sufficient cured film thickness, to give a water-borne coat. When the coating film forming method of the invention is used for repairing the coating films occurred already, the coating film portion to be repaired is preferably subjected in advance to solvent washing or sanding treatment. The method of applying the above composition is not particularly restricted but may be, for example, air spraying, airless spraying or electrostatic coating. The solid concentration and viscosity of the thermosetting water-borne coating composition to be applied can be adjusted according to the application method or for obtaining a desired cured film thickness, for example to a solid content of about 10 to 40% byweight andaviscosityof 800 to 5,000 cps/6 rpm (when measured with a B type viscometer), by adding deionized water, if necessary together with a thickening agent, an antifoaming agent, etc.

The cured film thickness is not particularly restricted but may be, for example, 10 to 50 μm. In the case of automotive bodies or parts, it is, for example, 10 to 30 μm.

The substrate or article with the water-borne coat formed thereon by application of the thermosetting water-borne coating composition is then heated for curing. The heating conditions can judiciously be selected by the skilled person in the art according to the substrate or article. As regards the heating temperature, a hot air temperature or a temperature not higher than 120° C. can be applied when the substrate or article has low heat resistance, such as a plastic material, while a temperature exceeding 120° C. can be applied when the substrate or article has high heat resistance, such as ametallicmaterial. The heating time can judiciously be selected according to the temperature employed.

In this way, a coating film can be obtained on the surface of a substrate or article.

Method of Forming a Multilayer Coating Film

The multilayer coating film forming method of the invention comprises the step (1) of obtaining a water-borne coat by applying a thermosetting water-borne coating composition to the surface of a substrate or article to be coated, the step (2) of applying a clear coating onto said water-borne coat to obtain a clear coat and the step (3) of curing both coats obtained by the steps (1) and (2) simultaneously by heating, in which the thermosetting water-borne coating composition is the thermosetting water-borne coating composition mentioned hereinabove.

The multilayer coating film forming method of the invention may also comprise applying a clear coating to the coating film obtained by the above coating film forming method, and then curing the same by heating. From the process curtailment viewpoint, the method is preferably carried out in the so-called wet on wet manner by applying the clear coating without curing the water-borne coat.

As the substrate or article, application technique and water-borne coat obtaining step in the above step (1) of the multilayer coating film forming method of the invention, there may be mentioned those mentioned hereinabove referring to the above coating film forming method.

In this case, from the viewpoint of the appearance of final product multilayer coating films, the water-borne coat obtained in the above step (1) should preferably have a water content of not more than 25% by weight. For obtaining such water-borne coats, it is preferred that the above step (1) comprise a heating procedure, generally called preheating, following formation of the water-borne coats by application of the water-borne coating composition. This preheating is effected, for example, by ordinary temperature setting, air drying, hot air drying or infrared heating. It is not intended to cure the water-borne coat obtained by application of the above coating composition but to evaporate the moisture in the water-borne coat approximately to the above water content. The preheating conditions may be adequately selected according to the productivity and the substrate species. From the productivity viewpoint, however, they are, for example, 40 to 80° C. and 2 to 10 minutes.

The multilayer coating film forming method of the present invention uses the above-mentioned thermosetting water-borne coating composition and therefore the curability at relatively low temperatures is high and partial curing of the water-borne coat can be attained by such preheating as well, so that interlayer bleeding or inversion with the clear coat can be prevented and multilayer coating films with a good appearance can be obtained.

The film thickness of the water-borne coat obtained in the above step (1) is not particularly restricted. In case where the multilayer coating film forming method of the invention is applied to automotive bodies or parts, it is preferably 5 to 25 μm from the viewpoint of the appearance of the multilayer coating films obtained.

The step (2) in the multilayer coating film forming method of the invention specifically comprises applying a clear coating to the water-borne coat obtained in step (1) to provide a clear coat.

Where the multilayer coating film forming method of the invention is applied to automotive bodies or parts, for instance, the clear coating may have the solvent-borne, water-borne or powder form, which contains a thermosetting resin.

As the solvent-borne clear coating, there may be mentioned, among others, those liquid clear coatings of the crosslinking curing type which are well known in the art, for example combinations of a thermosetting resin, such as a polyester resin, acrylic resin or fluororesin, having active hydrogen-containing functional groups such as hydroxy groups and a curing agent such as an amino resin and/or (blocked) polyisocyanate, or acrylic resins and/or polyester resins having a carboxylic acid-epoxy curing system.

As the water-borne clear coating, there may be mentioned, among others, those containing such a thermosetting resin neutralized with a base to render the same water-soluble or water-dispersible as mentioned above with respect to the solvent-borne clear coating. This neutralization may be effected by adding a tertiary amine, such as dimethylethanolamine or triethylamine, before or after polymerization.

As the powder type clear coating, there may be mentioned, for example, conventional powder coatings such as thermoplastic or thermosetting powder coatings. From the viewpoint of the physical properties of the coating films obtained, thermosetting powder coatings are preferred. As specific examples of the thermosetting powder coatings, there may be mentioned epoxy, acrylic and polyester type powder clear coatings. From the viewpoint of the weathering resistance of the multilayer coating films obtained, acrylic powder clear coatings are preferred.

In cases where the multilayer coating film forming method of the invention is applied to substrates or articles having low heat resistance, such as plastic materials or for repairing the coating films already occurring and existing on automotive bodies or parts, it is more preferred that, among such solvent-borne clear coatings as mentioned above, urethane curing, two-component type clear coatings for automobiles comprising combinations of a polyester resin, acrylic resin or fluororesin each having active hydrogen-containing functional groups such as hydroxy groups and a polyisocyanate be used. By using such urethane curing, two-component type clear coatings for automobiles, it is possible to provide multilayer coating films having the coating film performance characteristics of high weathering resistance, high water resistance, high chemical resistance and other.

In the multilayer coating film forming method of the invention, the clear coating may contain one or more of various additives, such as surface modifiers, viscosity modifiers, ultraviolet absorbers and light stabilizers and, further, one or more color pigments in an amount such that the transparency and topcoat film durability are not sacrificed.

In the step (2) of the multilayer coating film forming method of the invention, a clear coat is produced by applying the above clear coating onto the above water-borne coat. The technique for applying the above clear coating is not particularly restricted but specifically includes those mentioned above with respect to the above coating film forming method which are applicable when the clear coating is a solvent or water-borne one as well as conventional powder coating techniques when the clear coating is a powder coating composition. The film thickness to be applied is not particularly restricted but may be, for example, 30 to 60 μm.

The step (3) of the multilayer coating film forming method of the invention comprises curing by heating both coats obtained in the above steps (1) and (2). The conditions of the above heating can be adequately selected by the skilled person in the art according to the above clear coating species and substrate species and, when the substrate or article has low heat resistance, for example a plastic material, hot air drying or a temperature not exceeding 120° C. may be employed and, when the substrate or article has high heat resistance, for example a metallic material, a temperature exceeding 120° C. may be employed.

In obtaining multilayer coating films by application of a clear coating to a coating film obtained by the above coating film forming method, followed by heating for curing, the clear coating, application method and heating conditions may be the same as those mentioned hereinabove with respect to the steps (2) and (3) mentioned above.

Process for Producing Polycarbodiimide Compounds Modified for Hydrophilicity

The process for producing polycarbodiimide compounds modified for hydrophilicity according to the invention comprises the step (1) of reacting a polycarbodiimide compound (a) having at least two isocyanato groups per molecule with a hydroxy-terminated polyol (b) in a mole ratio such that the number of moles of the isocyanato groups of the polycarbodiimide compound (a) is in excess of the number of moles of the hydroxy groups of the polyol (b) and the step (2) of reacting the reaction product obtained in the above step with a modifier for hydrophilicity (c) having an active hydrogen and a hydrophilic moiety.

The first step of the process for producing polycarbodiimide compounds modified for hydrophilicity according to the invention comprises reacting a polycarbodiimide compound (a) having at least two isocyanato groups within each molecule with a hydroxy-terminated polyol As the polycarbodiimide compound (a) having at least two isocyanato groups within each molecule and the hydroxy-terminated polyol (b), there may specifically be mentioned those respectively mentioned hereinabove with respect to the polycarbodiimide compound modified for hydrophilicity for use in the thermosetting water-borne coating composition.

In the first step of the process for producing polycarbodiimide compounds modified for hydrophilicity according to the invention, a polycarbodiimide compound (a) having at least two isocyanato groups within each molecule is reacted with a hydroxy-terminated polyol (b) in a mole ratio such that the number of moles of the isocyanato groups of the polycarbodiimide compound (a) is in excess of the number of moles of the hydroxy groups of the hydroxy-terminated polyol (b). When the number of moles of the isocyanato group is equal to or smaller than that of the hydroxy group, the reaction for rendering the reaction product obtained in the above first step hydrophilic in the second step to be mentioned below cannot be carried out to a sufficient extent. From the viewpoint of reaction efficiency and economy, the mole ratio between the isocyanato groups of the polycarbodiimide compound (a) and the hydroxy groups of the polyol (b) is preferably 1.1/1.0 to 2.0/1.0. From the reaction efficiency viewpoint, the degree of polymerization of the polycarbodiimide compound (a) and polyol (b) in the reaction product obtained in this step is preferably 1 to 10.

The second step of the process for producing polycarbodiimide compounds modified for hydrophilicity according to the invention comprises reacting the reaction product obtained in the above step (1) with a modifier for hydrophilicity (c) having an active hydrogen atom and a hydrophilic moiety.

As specific examples of the above modifier for hydrophilicity (c), there may be mentioned those mentioned hereinabove referring to the polycarbodiimide compound modified for hydrophilicity for use in the thermosetting water-borne coating composition.

In the second step of the process for producing polycarbodiimide compounds modified for hydrophilicity according to the invention, the above reaction product is reacted with the above modifier for hydrophilicity (c) in a mole ratio such that the number of moles of the isocyanato groups of the above reaction product is equal to or in excess of the number of moles of the hydroxy groups of the modifier for hydrophilicity (c). When the number of moles of the isocyanato groups is less than the number of moles of the hydroxy groups, the reaction of the above reaction product with the modifier for hydrophilicity (c) cannot be carried out to a sufficient extent. The number of moles of the isocyanato groups in the above reaction product can be directly determined by measuring, or the calculated value based on the formulation in the first step may be employed.

In the first and/or second step, a catalyst may be used. The temperature in the above reactions is not particularly restricted but, from the viewpoint of reaction system control and reaction efficiency, a temperature of 60 to 120° C. is preferred. In the above reactions, an active hydrogen-free organic solvent is preferably used.

The above first and second steps can give polycarbodiimide compounds modified for hydrophilicity.

Polycarbodiimide Compound Modified for Hydrophilicity

The polycarbodiimide compound modified for hydrophilicity of the present invention is obtained by the above process for producing polycarbodiimide compounds modified for hydrophilicity, in which a carbodiimide unit and a polyol unit occur alternately via a urethane bond and repeatedly and a hydrophilic unit occurs at both molecular termini and is bound to such carbodiimide unit via a urethane bond.

As specific examples of said carbodiimide unit, polyol unit and hydrophilic unit, there may be mentioned those respectively mentioned hereinabove in relation to the polycarbodiimide compound modified for hydrophilicity for use in the thermosetting water-borne coating composition.

The thermosetting water-borne coating composition of the invention comprises a polycarbodiimide compound modified for hydrophilicity, which has a particular structure, and a carboxyl-containing aqueous resin composition and therefore is excellent in storage stability, and the coating films obtained therefrom are excellent in water resistance and curability and show a good coating film appearance since the reaction of the carboxyl group and carbodiimide group is utilized as the crosslinking reaction.

This is presumably because the polycarbodiimide compound modified for hydrophilicity, in the water-borne coating composition, is oriented with the polyalkylene moiety toward the aqueous phase and the carbodiimide group toward the inside to thereby form an aggregate like a micelle structure and, further, the monoalkoxy group at each molecular terminus of the polycarbodiimide compound modified for hydrophilicity takes a structure oriented toward the inside where the carbodiimide group exists. The dispersibility in water is therefore improved and it is further considered that the storage stability can be secured since the carbodiimide group, which is a functional group, is protected by the monoalkoxy group, hence is prevented from reacting with the carboxyl group in the coating composition.

Furthermore, when the modifier for hydrophilicity is a monoalkoxypolyalkylene glycol, it is considered that the monoalkoxy group is oriented toward the inside, so that the reaction with the carboxyl group in the coating composition is hindered, whereby the storage stability is still more improved.

It is further considered that as a result of volatilization of water and other solvents by heating after application, the above aggregate disintegrates and the carbodiimide group is deprotected and the curing reaction between the carbodiimide group and carboxyl group proceeds.

Therefore, the carboxyl group in the coating film supposedly disappears, possibly resulting in an improvement in the water resistance of the coating film obtained.

The coating films obtained from the thermosetting water-borne coating composition of the invention are excellent not only in water resistance but also in adhesion. This is presumably because the polycarbodiimide compound modified for hydrophilicity within the thermosetting water-borne coating composition has high polarity and/or it has the urethane bond and —N=C=N— group, which are said to be effective in improving the physical properties of coating films.

The coating film forming method of the invention uses the above thermosetting water-borne coating composition and therefore the coating films obtained have excellent water resistance. The above thermosetting water-borne coating composition can be cured even at relatively low temperatures, so that it can be applied to substrates or articles having low heat resistance, such as plastic materials, as well.

Further, the multilayer coating film forming method of the invention uses the above thermosetting water-borne coating composition and therefore the multilayer coating films obtained are excellent in water resistance and appearance. Since the steps (1) and (2) can be conducted by the so-called wet-on-wet technique, the process curtailment is possible. For improving the appearance of the multilayer coating films obtained, the water-borne coats obtained in step (1) are preferably subjected to the so-called preheating. This is presumably because this preheating causes partial curing of the water-borne coats and it becomes difficult for the interlayer bleeding or inversion between both coats obtained in steps (1) and (2) to occur.

Since it has good storage stability and provides coating films having good appearance, water resistance and adhesion, the thermosetting water-borne coating composition of the invention is suited for use as a coating for automobiles and the coating film forming method and multilayer coating film forming method of the invention are judiciously applied to automotive bodies and parts. Further, since low temperature curing is possible, they are useful also in repairing the coating films already occurring on automotive bodies and parts and the like.

Since it is excellent in storage stability, the thermosetting water-borne coating composition of the invention can be used as one component type thermosetting water-borne coating. Since the amount of organic solvent(s) evaporating from such thermosetting water-borne coating composition is small, the composition does not cause any environment problem but can be used in various fields.

BEST MODES FOR CARRYING OUT THE INVENTION

The following examples illustrate the present invention in further detail. They are, however, by no means limitative of the scope of the invention. Unless otherwise specified, the amounts charged or used ("part(s)") are on the weight basis.

PRODUCTION EXAMPLE 1

Preparation of Carboxyl-containing Aqueous Acrylic Resin A1

A reaction vessel equipped with a stirrer, nitrogen inlet tube, temperature controller, condenser and dropping funnel was charged with 400 parts of butyldiglycol and the contents were heated to 120° C. with stirring in a nitrogen atmosphere.

The dropping funnel was charged with a monomer mixture composed of 300 parts of styrene, 250 parts of ethyl acrylate, 150 parts of 2-hydroxyethyl methacrylate, 223 parts of 2-ethylhexyl acrylate and 77 parts of methacrylic acid, together with 30 parts of Kayaester O (peroxide polymerization initiator, product of Kayaku-Akzo). While the reactor inside temperature was maintained at 120° C., the monomer mixture and initiator were added dropwise to the reactor contents over 3 hours. After dropping, the resulting mixture was further maintained at 120° C. for 2 hours. Then, 80 parts of dimethylethanolamine and 1,823 parts of deionized water were added for rendering the resin solids soluble, whereby a carboxyl-containing aqueous acrylic resin A1 with a resin solid content of 30% was obtained. The acid value of the resin solids was 51.

PRODUCTION EXAMPLE 2

Preparation of Carboxyl-containing Aqueous Acrylic Resin A2

The same reaction vessel as used in Production Example 1 was charged with 23.89 parts of dipropylene glycol methyl ether and 16.11 parts of propylene glycol methyl ether, and the mixture was heated to 105° C. with stirring in a nitrogen atmosphere.

The dropping funnel was charged with a monomer mixture composed of 13.1 parts of methyl methacrylate, 68.4 parts of ethyl acrylate, 11.6 parts of 2-hydroxyethyl methacrylate and 6.9 parts of methacrylic acid, and 15.0 parts of dipropylene glycol methyl ether and 1.3 parts of Kayaester O (peroxide polymerization initiator, product of Kayaku-Akzo). While the reactor inside temperature was maintained at 105° C., the monomer mixture and initiator solution were added dropwise over 3 hours. After dropping, the temperature was maintained at 105° C. for further 2 hours.

Then, 16.11 parts of the solvent was distilled off under reduced pressure, 204 parts of deionized water and 7.14 parts of dimethylaminoethanol were added to give a carboxyl-containing aqueous acrylic resin A2. The resin obtained had a solid content of 30% by weight, a solid matter acid value of 40, a solid matter hydroxyl value of 50 and a viscosity of 140 poises (E type viscometer, 1 rpm/25° C.).

PRODUCTION EXAMPLE 3

Preparation of Carboxyl-containing Aqueous Acrylic Resin A3

The same reaction vessel as used in Production Example 1 was charged with 126.5 parts of deionized water, and the contents were heated to 80° C. with stirring in a nitrogen atmosphere.

From the dropping funnel, a monomer emulsion composed of 10.22 parts of methyl methacrylate, 58.36 parts of ethyl acrylate, 7.42 parts of 2-hydroxyethylmethacrylate, 4.00 parts of acrylamide, 0.5 part of Aqualon HS-10 (surfactant, polyoxyethylene alkylpropenylphenyl ether sulfate ester, product of Daiichi Kogyo Seiyaku), 0.5 part of Adeka Reasoap NE-20 (80% aqueous solution of a surfactant, α-[1-[(allyloxy)methyl]-2-(nonylphenoxy)ethyl]-ω-hydroxyoxyethylene, product of Asahi Denka) and 80 parts of deionized water and an initiator solution composed of 0.24 part of ammonium persulfate and 10 parts of deionized water were dropped over 2 hours. After dropping, the reaction mixture was maintained at 80° C.

Further, a monomer emulsion composed of 15.07 parts of ethyl acrylate, 1.86 parts of 2-hydroxyethylmethacrylate, 3.07 parts of methacrylic acid, 0.2 part of Aqualon HS-10 and 10 parts of deionized water and an initiator solution composed of 0.06 part of ammonium persulfate and 10 parts of deionized water were dropped over 0.5 hour. After dropping, the reaction mixture was maintained at 80° C. for 2 hours.

The mixture was then cooled to 40° C. and filtered through a 400-mesh filter, and adjusted to pH 7.0 by adding 167.1 parts of deionized water and 0.32 part of dimethylaminoethanol, to give a carboxyl-containing aqueous acrylic resin A3 emulsion with a mean particle size of 200 nm, a solid content of 20% by weight, a solid matter acid value of 20 and a solid matter hydroxyl value of 40.

PRODUCTION EXAMPLE 4

Preparation of Carboxyl-containing Aqueous Polyurethane Resin A4

The same reaction vessel as used in Production Example 1 was charged with 40.2 parts of dimethylolpropionic acid, 30 parts of triethylamine and 312 parts of N-methylpyrrolidone, and the mixture was heated to 90° C.

for effecting dissolution. Then, 290 parts of isophoronediisocyanate and 700 parts of polyhexamethylene carbonate diol (molecular weight 1,000) were added, and the reaction was allowed to proceed for 10 minutes with stirring, 1.03 parts of dibutyltin dilaurate was then added and the temperature was raised to 95° C. and the reaction was allowed to proceed for 1 hour.

A reaction vessel equipped with the same attachments as above was charged with 1,757 parts of deionized water and 9.2 parts of hydrazine hydrate. Thereto was added, with stirring, the urethane prepolymer solution obtained in the above manner, followed by 30 minutes of stirring, to give a carboxyl-containing aqueous polyurethane resin A4 with a solid content of 33% by weight and a solid matter acid value of 16.3.

PRODUCTION EXAMPLE 5

Preparation of Carboxyl-containing Aqueous Polyester Resin A5

A reaction vessel equipped with a stirrer, nitrogen inlet tube, temperature controller, condenser and fractionating column was charged with 155 parts of coconut oil, 248 parts of trimethylolpropane and 1.7 parts of dibutyltin oxide, and heating was started under dry nitrogen for dissolving the materials and then the temperature was gradually raised to 210° C. for effecting transesterification, followedbycooling. Then, 267 parts of isophthalic acid, 59 parts of adipic acid, 33 parts of neopentyl glycol and 41 parts of Epol (hydrogenated polyisoprene diol, molecular weight 1,860, product of Idemitsu Petrochemical) were added and the temperature was gradually raised to 220° C. for effecting dehydration esterification. After progress of the dehydration esterification to a resin acid value of 10, the reaction mixture was cooled to 150° C., 40 parts of trimellitic anhydride was added and the reaction was allowed to proceed to a resin acid value of 40, followed by cooling to 140° C. Further, 77 parts of ε-caprolactone was added and the reaction was allowed to proceed for 1 hour and thus the reaction procedure was finished. To the polyester resin obtained were added 75 parts of Solvesso #150 (aromatic hydrocarbon solvent, product of Esso Chemical) and 75 parts of butylcellosolve, to give a polyester resin with a solid content of 83% by weight, a solid matter acid value of 37 and an average molecular weight of 2,850.

Calcium hydroxide (0.41 part) and 4.42 parts of triethylamine were admixed with 100 parts of the above resin. To this mixture was added 191.6 parts of deionized water to give a carboxyl-containing aqueous polyester resin A5 with a solid content of 28% by weight.

PRODUCTION EXAMPLE 6

Preparation of Aqueous Epoxy-modified Carboxyl-containing Acrylic Resin A6

The same reaction vessel as used in Production Example 1 was charged with 255 parts of the high-molecular-weight epoxy resin Epikote EP-1256 (phenoxy resin, product of Yuka Shell Epoxy), 77 parts of diethylene glycol monobutyl ether and 305 parts of methoxypropanol and the mixture was gradually heated to and maintained at 110° C. The high-molecular-weight epoxy resin was dissolved in 2 hours.

The dropping funnel was charged with a monomer mixture solution composed of 21 parts of methacrylic acid, 12 parts of ethyl acrylate, 12 parts of styrene, 4 parts of benzoyl peroxide and 15 parts of toluene. While the reactor inside temperature was maintained at 110° C., themonomermixture/initiator solution was added dropwise over 2 hours and, after dropping, the reaction mixture was further maintained at 110° C. for 3 hours.

The above reaction mixture was cooled to 70° C. and the solvent was distilled off under reduced pressure. The same amount as the solvent distilled off of butylcellosolve was further added, to give an epoxy-modified acrylic resin solution with a solid content of 60% by weight. The epoxy-modified acrylic resin had a number average molecular weight of 3,500 and a solid matter acid value of 45.6.

A neutralizing agent composed of 10.5 parts of dimethylethanolamine and 622 parts of deionized water was added dropwise over 2 hours to the epoxy-modified acrylic resin solution cooled to room temperature, with further continued stirring, and then stirring was continued for 1 hour. Then, 10.5 parts of dimethylethanolamine was added gradually, the solvent and water were then distilled off under reduced pressure to give an aqueous epoxy-modified, carboxyl-containing acrylic resin A6 with a solid content of 35% by weight.

PRODUCTION EXAMPLE 7

Preparation of Polysiloxane- and Carboxyl-containing Aqueous Acrylic Resin A7

The same reaction vessel as used in Production Example 1 was charged with 200 parts of polyether type polysilocane SF 8428 (carbinol-modified silicone oil, number average molecular weight 3,000, hydroxyl equivalent 1,600, product of Toray Dow Corning) and 400 parts of butyldiglycol and the temperature was raised to and maintained at 120° C.

The dropping funnel was charged with a monomer mixture composed of 300 parts of styrene, 250 parts of ethyl acrylate, 150 parts of 2-hydroxyethyl methacrylate, 223 parts of 2-ethylhexyl acrylate and 77 parts of methacrylic acid, together with 30 parts of Kayaester O (peroxide polymerization initiator, product of Kayaku-Akzo). While the reactor inside temperature was maintained at 120° C., the monomer mixture and initiator were added dropwise over 3 hours. After dropping, the temperature was further maintained at 120° C. for 2 hours.

Further, 80 parts of dimethylethanolamine and 3,522 parts of deionized water were added for effecting dissolution of the contents, to give a polysiloxane- and carboxyl-containing aqueous acrylic resin A7 with a solid content of 23% by weight and a solid matter acid value of 43.

PRODUCTION EXAMPLE 8

Preparation of Solvent-borne Clear Coating Composition

The same reaction vessel as used in Production Example 1 was charged with 57 parts of xylene and 6 parts of n-butanol, and a 20-part portion of a monomer mixture prepared by mixing up 30.0 parts of styrene, 45.2 parts of ethylhexylmethacrylate, 5.5 parts of ethylhexyl acrylate, 16.2 parts of 2-hydroxyethyl methacrylate, 3.1 parts of methacrylic acid and 4.0 parts of azobisisobutyronitrile was added, and the temperature was raised to and maintained at 130° C. with stirring. While this temperature was maintained and the xylene was refluxed, the remaining 84-part portion of the monomer mixture was added dropwise over 2 hours and then a solution composed of 0.5 part of azobisisobutyronitrile, 23 parts of xylene and 14 parts of n-butanol was added dropwise over 20 minutes. The reaction mixture was maintained at 130° C. with stirring for further 2 hours and, in this manner, the reaction procedure was finished, to give an acrylic resin solution with a solid content of 50% by weight, a solid matter hydroxyl value of 70 and a number average molecular weight of 3,400.

A solvent-borne clear coating was prepared by homogeneously mixing 100 parts of the above acrylic resin solution with 16.7 parts of Desmodur N-75 (isocyanate, product of Sumitomo Bayer Urethane).

PRODUCTION EXAMPLE 9

Preparation of Aqueous Pigment-dispersing Resin

The same reaction vessel as used in Production Example 5 was charged with 273 parts of tall oil fatty acids, 197 parts of trimethylolpropane, 78 parts of neopentyl glycol, 91 parts of hydrogenated bis phenol A, 204 parts of isophthalic acid, 157 parts of trimellitic anhydride and 20 parts of xylene, and the temperature was raised with stirring. The reaction temperature was maintained at 180° C. to 210° C. and the dehydration esterification reaction was allowed to proceed for 5 hours, to give an alkyd resin with a solid matter acid value of 65, a solid matter hydroxyl value of 100, a number average molecular weight of 1,500 and an oil length of 30. Then, 183 parts of ethylene glycol monobutyl ether and 96 parts of dimethylethanolamine were added and the resulting mixture was diluted with deionized water to give an aqueous resin for pigment dispersing with a solid content of 50% by weight.

PRODUCTION EXAMPLE 10

Preparation of Pigment Dispersion Paste B2

A pigment dispersion paste B2 was prepared by mixing 160 parts of the aqueous pigment-dispersing resin obtained in Production Example 9, 320 parts of Tipaque R-820 (rutile type titanium dioxide pigment, product of Ishihara Sangyo) and 78 parts of deionized water together, further adding 500 cc of glass beads, premixing the whole mixture in a stirrer and then mixing up the same for effecting dispersion in a coating conditioner for 2 hours.

PRODUCTION EXAMPLE 11

Production of Carbodiimide Compound C1 Modified for Hydrophilicity 4,4-Dicyclohexylmethanediisocyanate (700 parts) and 14 parts of a carbodiimidating catalyst (3-methyl-1-phenyl-2-phospholene-1-oxide) were heated at 180° C. for 16 hours, to give isocyanato-terminated 4,4-dicyclohexylmethanecarbodiimide (carbodiimide group content: 4 equivalents). Then, 226.8 parts of the carbodiimide obtained was dissolved in 106.7 parts of N-methylpyrrolidone with heating at 90° C. Then, 200 parts of polypropylene glycol (number average molecular weight: 2,000) was added and the mixture was stirred at 40° C. for 10 minutes, 0.16 part of dibutyltin dilaurate was added, the temperature was again raised to 90° C. and the reaction was allowed to proceed at that temperature for 3 hours. Further, 96.4 parts of poly(oxyethylene) mono-2-ethylhexyl ether having 8 oxyethylene units was added, the reaction was allowed to proceed at 100° C. for 5 hours, and 678.1 parts of deionized water was added at 50° C. to give an aqueous dispersion of a carbodiimide compound C1 modified for hydrophilicity with a resin solid content of 40% by weight.

PRODUCTION EXAMPLE 12

Production of Carbodiimide Compound C2 Modified for Hydrophilicity

Isophoronediisocyanate (700 parts) and 14 parts of a carbodiimidation catalyst (3-methyl-1-phenyl-2-phospholene-1-oxide) were heated at 180° C. for 14 hours, to give isocyanato-terminated isophoronecarbodiimide (carbodiimide group content: 10 equivalents). Then, 400.4 parts of the carbodiimide obtained was dissolved in 150.1 parts of N-methylpyrrolidone with heating at 90° C. Then, 200 parts of polycarbonatediol (number average molecular weight: 2,000) was added and the mixture was stirred at 40° C. for 10 minutes, 0.24 part of dibutyltin dilaurate was added, the temperature was again raised to 90° C. and the reaction was allowed to proceed for 3 hours. Further, 213.2 parts of poly(oxyethylene) monolauryl ether having 20 oxyethylene units was added, the reaction was allowed to proceed at 100° C. for 5 hours, and 1,070.3 parts of deionized water was added at 50° C. to give an aqueous dispersion of a carbodiimide compound C2 modified for hydrophilicity with a resin solid content of 40% by weight.

PRODUCTION EXAMPLE 13

Production of Carbodiimide Compound C3 Modified for Hydrophilicity 4,4-Dicyclohexylmethanediisocyanate (700 parts) and 14 parts of a carbodiimidating catalyst (3-methyl-1-phenyl-2-phospholene-1-oxide) were heated at 180° C. for 16 hours, to give isocyanato-terminated 4,4-dicyclohexylmethanecarbodiimide (carbodiimide group content: 4 equivalents). Then, 453.6 parts of the carbodiimide obtained was dissolved in 188.4 parts of N-methylpyrrolidone with heating at 90° C. Then, 300 parts of polycaprolactone diol (number average molecular weight: 1,000) was added and the mixture was stirred at 40° C. for 10 minutes, 0.24 part of dibutyltin dilaurate was added, the temperature was again raised to 90° C. and the reaction was allowed to proceed at that temperature for 3 hours. Further, 32.4 parts of sodium hydroxypropanesulfonate was added, the reaction was allowed to proceed at 100° C. for 5 hours, and 990.6 parts of deionized water was added at 50° C. to give an aqueous dispersion of a carbodiimide compound C3 modified for hydrophilicity with a resin solid content of 40% by weight.

PRODUCTION EXAMPLE 14

Production of Carbodiimide Compound C4 Modified for Hydrophilicity 4,4-Dicyclohexylmethanediisocyanate (700 parts) and 14 parts of a carbodiimidating catalyst (3-methyl-1-phenyl-2-phospholene-1-oxide) were heated at 180° C. for 32 hours, to give isocyanato-terminated 4,4-dicyclohexylmethanecarbodiimide (carbodiimide group content: 10 equivalents). Then, 244.2 parts of the carbodiimide obtained was reacted with 59.2 parts of poly(oxyethylene) monomethyl ether having 6 oxyethylene units at 100° C. for 48 hours and then 455.1 parts of deionized water was added at 50° C. to give an aqueous dispersion of a carbodiimide compound C4 modified for hydrophilicity with a resin solid content of 40% by weight.

PRODUCTION EXAMPLE 15

Production of Carbodiimide Compound C5 Modified for Hydrophilicity 4,4-Dicyclohexylmethanediisocyanate (700 parts) and 14 parts of a carbodiimidating catalyst (3-methyl-1-phenyl-2-phospholene-1-oxide) were heated at 180° C. for 16 hours, to give isocyanato-terminated 4,4- dicyclohexylmethanecarbodiimide (carbodiimide group content: 4 equivalents). Then, 113.4 parts of the carbodiimide obtained was reacted with 74.0 parts of polyethylene glycol having 8 oxyethylene units at 100° C. for 48 hours and then 281.1 parts of deionized water was added at 50° C. to give an aqueous dispersion of a carbodiimide compound C5 modified for hydrophilicity with a resin solid content of 40% by weight.

PRODUCTION EXAMPLE 16

Preparation of Steel Panels Having an Intermediate Coat

Degreased cold-finished steel panels (70×150×0.5 mm) was provided with a 20 $\mu$m thick electrodeposited coating using Powertop U-100 (cationic electrodeposition coat, product of Nippon Paint). Steel panels having an intermediate coat were prepared by applying Orga P-2 Light Gray (intermediate coat, product of Nippon Paint) onto the above electrodeposited coating to a film thickness of 35 $\mu$m in an intermediate coating line.

PRODUCTION EXAMPLE 17

Preparation of Plastic Sheets Having an Intermediate Coat

Plastic sheets having an intermediate coat were prepared by applying a solvent-borne intermediate coat (urethane-curing acrylic resin-based coating, product of NIPPON BEE CHEMICAL CO. LTD.) to degreased polypropylene sheets (70×150×0.5 mm) to a film thickness of 35 $\mu$m in an intermediate coating line.

EXAMPLES 1 to 9

Thermosetting Water-borne Coating Compositions 1 to 9

According to the formulations given in Table 1, thermosetting water-borne coating compositions 1 to 9 were prepared by mixing up the ingredients to attain homogeneous dispersion.

COMPARATIVE EXAMPLES 1 and 2

Thermosetting Water-borne Coating Compositions 10 and 11

According to the formulations given in Table 1, thermosetting water-borne coating compositions 10 and 11 were prepared by mixing up the ingredients to attain homogeneous dispersion.

EXAMPLES 10 and 11

The thermosetting water-borne coating compositions 1 and 2 obtained in Examples 1 and 2, respectively, were diluted with deionized water to thereby adjust the viscosity to 30 seconds at 25° C. (Ford cup #4). The diluted thermosetting water-borne coating compositions were respectively applied to the steel panels having an intermediate coat as prepared in Production Example 16 to a cured water-borne coat thickness of 15 $\mu$m, using an air sprayer in an environment maintained at a temperature of 23° C. and a humidity of 60% in the manner of two-stage coating. The water-borne coats obtained were preheated at 80° C. for 10 minutes and then cooled to room temperature, and the solvent-borne clear coating prepared in Production Example 8 was further applied under the same conditions to a cured clear coat thickness of 40 $\mu$m by two-stage coating, followed by 5 minutes of setting.

The steel panels having an intermediate coat with both coats formed thereon were then heated at 120° C. for 30 minutes to give test sheets each having a multilayer coating film.

EXAMPLES 12 and 13

The thermosetting water-borne coating compositions 1 and 2 obtained in Examples 3 and 4, respectively, were diluted with deionized water to thereby adjust the viscosity to 30 seconds at 25° C. (Ford cup #4).

The diluted thermosetting water-borne coating compositions were respectively applied to the steel panels having an intermediate coat as prepared in Production Example 16 to a coating film thickness of 40 $\mu$m, using an air sprayer in an environment maintained at a temperature of 23° C. and a humidity of 60%, and the water-borne coats obtained were allowed to set for 15 minutes in the same environment and then further heated at 140° C. for 30 minutes to give test sheets having a coating film.

EXAMPLE 14

The thermosetting water-borne coating composition 5 obtained in Example 5 was diluted with deionized water to thereby adjust the viscosity to 30 seconds at 25° C. (Ford cup #4). The diluted thermosetting water-borne coating composition was applied to degreased cold-finished steel panels (70×150×0.5 mm) to a dry film thickness of 15 $\mu$m using a bar coater, and the water-borne coats obtained were heated at 80° C. for 20 minutes to give test sheets having a coating film.

EXAMPLE 15

The thermosetting water-borne coating composition 6 obtained in Example 6 was diluted with deionized water to thereby adjust the viscosity to 30 seconds at 25° C. (Ford cup #4). The diluted thermosetting water-borne coating composition was applied to the steel panels having an intermediate coat as obtained in Production Example 16 to a cured water-borne coat thickness of 15 $\mu$m, using an air sprayer in an environment maintained at a temperature of 20° C. and a humidity of 75% in the manner of two-stage coating. The water-borne coats obtained were exposed to air blowing in the same environment until drying of the coated surface and then cooled to room temperature, and the solvent-borne clear coating prepared in Production Example 8 was further applied under the same conditions to a cured clear coat thickness of 40 $\mu$m by two-stage coating, followed by 5 minutes of setting.

The steel panels having an intermediate coat with both coats formed thereon were then heated at 60° C. for 30 minutes to give test sheets each having a multilayer coating film.

EXAMPLES 16 to 18

The thermosetting water-borne coating compositions 7 to 9 obtained in Examples 7 to 9, respectively, were diluted with deionized water to thereby adjust the viscosity to 30 seconds at 25° C. (Ford cup #4). The diluted thermosetting water-borne coating compositions were respectively applied to the plastic sheets having an intermediate coat as prepared in Production Example 17 to a cured film thickness of 15 $\mu$m, using an air sprayer in an environment maintained at a temperature of 23° C. and a humidity of 70% in the manner of two-stage coating. The water-borne coats obtained were allowed to set under the same conditions for 5 minutes and, then, the solvent-borne clear coating prepared in Production Example 8 was further applied under the same conditions to a cured clear film thickness of 40 $\mu$m by two-stage coating, followed by 5 minutes of setting.

The plastic sheets having an intermediate coat with both coats formed thereon were then heated at 80° C. for 30 minutes to give test sheets each having a multilayer coating film.

COMPARATIVE EXAMPLES 3 and 4

Test sheets each having a multilayer coating film were obtained in the same manner as in Examples 16 to 18 except that, in lieu of the thermosetting water-borne coating compositions 7 to 9 obtained in Examples 7 to 9, the thermosetting water-borne coating compositions 10 and 11 obtained in Comparative Examples 1 and 2, respectively, were diluted with deionized water to thereby adjust the viscosity to 30 seconds at 25° C. (Ford cup #4).

Evaluation Tests

The thermosetting water-borne coating compositions 1 to 11 obtained in Examples 1 to 9 and Comparative Examples 1 and 2 were each subjected to the following evaluation tests. The results of evaluation are summarized in Table 1.

<Storage stability>

The initial coatings and the coating films obtained were observed and then stored at 40° C. for 10 days and observed for changes in properties of the coatings and condition of the coating films obtained from the coatings. The evaluation criteria were as follows:

○: No viscosity increase as compared with the initial coating, no gelation and no deterioration in performance of the coating films obtained.

Δ: An viscosity increase as compared with the initial coating, gelation and/or deterioration in performance of the coating films obtained is often remarkable.

X: An viscosity increase as compared with the initial coating, gelation and/or deterioration in performance of the coating films obtained is very often remarkable.

Further, the test sheets obtained in Examples 13 to 21 and Comparative Examples 5 and 6 were subjected to the evaluation tests mentioned below. The evaluation results are summarized in Table 2.

The multilayer coating films or coating films on the test sheets as obtained in Examples 10 to 18 and Comparative Examples 3 and 4 were subjected to the evaluation tests mentioned below. The evaluation results are summarized in Table 2.

<Coating film appearance>

Each coating film was evaluated for smoothness by irradiating the test sheet with a 30-W, 30-cm-long fluorescent lamp from a distance of about 2 m above the coated surface and observing, by the eye, the condition of the image of the fluorescent lamp reflected in the coated surface. In each case, no appearance abnormality was found.

<Water resistance>

(a) Warm water immersion test

Each test sheet was immersed in a constant temperature water tank maintained at 40° C. for 10 days, then taken out and observed for changes in coating film surface by the eye.

(b) Tape peeling test

A cut was made in each test sheet with a cutter knife and the test sheet was immersed in a constant temperature water tank maintained at 40° C. for 10 days and then taken out, the upper part of the cut was subjected with peeling with an adhesive tape and the test sheet was examined for coating film peeling. The evaluation criteria for the above tests (a) and (b) are as follows:

○: The coating film surface shows no change and the adhesion upon peeling with an adhesive tape is good.

Δ: The coating film surface shows slight changes and the adhesion upon peeling with an adhesive tape is rather poor.

X: The coating film surface shows marked changes and the adhesion upon peeling with an adhesive tape is very poor.

<Adhesion>

Eleven parallel cuts, with intervals of about 1.5 mm, were made with a cutter knife in each test sheet both lengthwise and breadthwise, like a check pattern, and a 24 mm wide cellophane adhesive tape was stuck fast thereto and then peeled off violently, and the number of squares peeled off from the check was counted. The evaluation criteria are as follows:

○: The number of squares peeled off is 0.

Δ: The number of squares peeled off is 0, but partial peeling along a cut line(s) and/or edge chipping is found.

X: The number of squares peeled off is 1 or more.

TABLE 1

| | | Example | | | | | | | | | Compar Ex | |
|---|---|---|---|---|---|---|---|---|---|---|---|---|
| | | 1 | 2 | 3 | 4 | 5 | 6 | 7 | 8 | 9 | 1 | 2 |
| The amounts of compositions | aqueous acrylic resin A1 | 80 | — | — | — | — | — | — | — | — | — | — |
| | aqueous acrylic resin A2 | — | 30 | — | — | — | — | 30 | 30 | 30 | 30 | 30 |
| | aqueous acrylic resin A3 | — | 55 | — | — | — | — | 50 | 60 | 60 | 60 | 60 |
| | aqueous polyurethane resin A4 | — | — | 70 | — | — | 20 | — | — | — | — | — |
| | aqueous polyester resin A5 | — | — | — | 70 | — | — | — | — | — | — | — |
| | epoxy-modified aqueous acrylic resin A6 | — | — | — | — | 70 | — | — | — | — | — | — |
| | polysiloxane-containing aqueous acrylic resin A7 | — | — | — | — | — | 70 | — | — | — | — | — |
| | pigment dispersion paste B1 | 10 | 10 | — | — | — | 10 | 10 | 10 | 10 | 10 | 10 |
| | pigment dispersion paste B2 | — | — | 70 | 70 | — | — | — | — | — | — | — |
| | type of polycarbodiimide compounds modified for hydrophilicity/amount | C1/20 | C1/15 | C1/30 | C1/30 | C1/30 | C1/10 | C1/20 | C2/10 | C3/10 | C4/10 | C5/10 |
| ratio of carboxyl group and carbodiimide group (mole ratio of resin solid) | | 1/0.6 | 1/0.9 | 1/1 | 1/0.8 | 1/0.3 | 1/0.4 | 1/1.2 | 1/0.9 | 1/0.8 | 1/1.2 | 1/0.8 |
| Storage stability | | ○ | ○ | ○ | ○ | ○ | ○ | ○ | ○ | ○ | Δ | X |

The amounts of compositions are the weight basis.
The pigment dispersion paste B1 is Alpaste 7160N (Toyo aluminium, aluminium content: 65% by weight, solid content:100% by weight).

TABLE 2

| | | Example | | | | | | | | | Compar. Ex. | |
|---|---|---|---|---|---|---|---|---|---|---|---|---|
| | | 10 | 11 | 12 | 13 | 14 | 15 | 16 | 17 | 18 | 3 | 4 |
| Thermosetting water-borne | | | | | Example | | | | | | Compar. Ex. | |
| coating composition species | | 1 | 2 | 3 | 4 | 5 | 6 | 7 | 8 | 9 | 1 | 2 |
| Evaluation results | Water resistance | ○ | ○ | ○ | ○ | ○ | ○ | ○ | ○ | ○ | X | Δ |
| | Adhesion | ○ | ○ | ○ | ○ | ○ | ○ | ○ | ○ | ○ | X | Δ |

As is evident from the results shown in Table 1 and Table 2, the water-borne coating compositions containing any of the polycarbodiimide compounds modified for hydrophilicity according to the present invention are superior in storage stability and, further, the coating films and multilayer coating films obtained therefrom are good in appearance as well as in water resistance and adhesion.

What is claimed is:

1. A thermosetting water-borne coating composition comprising a polycarbodiimide compound modified for hydrophilicity and a carboxyl-containing aqueous resin composition,
    wherein said polycarbodiimide compound modified for hydrophilicity has a structure such that a carbodiimide unit and a polyol unit occur alternately via a urethane bond and repeatedly and
    a hydrophilic unit occurs at both molecular termini and is bound to such carbodiimide unit via a urethane bond.

2. The thermosetting water-borne coating composition according to claim 1,
    wherein the number of repetitions of said carbodiimide unit and polyol unit is 1 to 10.

3. The thermosetting water-borne coating composition according to claim 1,
    wherein said carbodiimide unit is obtainable from a polycarbodiimide compound (a) having at least two isocyanato groups within each molecule by removal of the isocyanato groups,
    said polyol unit is obtainable from a polyol (b) having at least two hydroxy groups within each molecule by removal of the active hydrogen atoms, and
    said hydrophilic unit is obtainable from a modifier for hydrophilicity (c) having an active hydrogen atom and a hydrophilic moiety by removal of the active hydrogen atom.

4. The thermosetting water-borne coating composition ccording to claim 1,
    wherein said modifier for hydrophilicity (c) is a onoalkoxy-polyalkylene glycol.

5. The thermosetting water-borne coating composition according to claim 4,
    wherein an alkoxy moiety of said monoalkoxy-polyalkylene glycol contains 4 to 20 carbon atoms.

6. The thermosetting water-borne coating composition according to claim 1,
    wherein the mole ratio of the total number of carboxyl groups within said thermosetting water-borne coating composition to the total number of carbodiimide groups within said polycarbodiimide compound modified for hydrophilicity is 1/0.05 to 1/3.

7. The thermosetting water-borne coating composition according to claim 1 which further comprises a coloring component.

8. A method of forming a coating film comprising applying a thermosetting water-borne coating composition
    comprising a polycarbodiimide compound modified for hydrophilicity and a carboxyl-containing aqueous resin composition,
    wherein said polycarbodiimide compound modified for hydrophilicity has a structure such that a carbodiimide unit and a polyol unit occur alternately via a urethane bond and repeatedly and
    a hydrophilic unit occurs at both molecular termini and is bound to such carbodiimide unit via a urethane bond to the surface of an article or substrate to be coated and curing the resulting water-borne coat by heating.

9. A method of forming a multilayer coating film
    comprising applying a clear coating to the surface of a coating film obtainable by the method of forming a coating film according to claim 8 and curing the resulting clear coat by heating.

10. A method of forming a multilayer coating film comprising:
    a step (1) of applying a thermosetting water-borne coating composition
        comprising a polycarbodiimide compound modified for hydrophilicity and a carboxyl-containing aqueous resin composition,
        wherein said polycarbodiimide compound modified for hydrophilicity has a structure such that a carbodiimide unit and a polyol unit occur alternately via a urethane bond and repeatedly and
        a hydrophilic unit occurs at both molecular termini and is bound to such carbodiimide unit via a urethane bond to the surface of an article or substrate to be coated to thereby provide a water-borne coat;
    a step (2) of applying a clear coating onto said water borne coat to provide a clear coat; and
    a step (3) of curing both coats obtained by the steps (1) and (2) simultaneously by heating.

11. The method of forming a multilayer coating film according to claim 10,
    wherein said step (1) comprises applying a thermosetting water-borne coating composition, followed by heating, to provide a water-borne coat.

12. The thermosetting water-borne coating composition according to claim 2,
    wherein said carbodiimide unit is obtainable from a polycarbodiimide compound (a) having at least two isocyanato groups within each molecule by removal of the isocyanato groups,
    said polyol unit is obtainable from a polyol (b) having at least two hydroxy groups within each molecule by removal of the active hydrogen atoms, and
    said hydrophilic unit is obtainable from a modifier for hydrophilicity (c) having an active hydrogen atom and a hydrophilic moiety by removal of the active hydrogen atom.

13. The thermosetting water-borne coating composition according to claim 2, wherein said modifier for hydrophilicity (c) is a monoalkoxy-polyalkylene glycol.

14. The thermosetting water-borne coating composition according to claim 3, wherein said modifier for hydrophilicity (c) is a monoalkoxy-polyalkylene glycol.

15. The thermosetting water-borne coating composition according to claim 3, wherein the mole ratio of the total number of carboxyl groups within said thermosetting water-borne coating composition to the total number of carbodiimide groups within said polycarbodiimide compound modified for hydrophilicity is 1/0.05 to 1/3.

16. The thermosetting water-borne coating composition according to claim 4, wherein the mole ratio of the total number of carboxyl groups within said thermosetting water-borne coating composition to the total number of carbodiimide groups within said polycarbodiimide compound modified for hydrophilicity is 1/0.05 to 1/3.

17. A method of forming a coating film as in claim 8, wherein the number of repetitions of said carbodiimide unit and polyol unit is 1 to 10.

18. A method of forming a coating film as in claim 8, wherein said carbodiimide unit is obtainable from a polycarbodiimide compound (a) having at least two isocyanato groups within each molecule by removal of the isocyanato groups, said polyol unit is obtainable from a polyol (b) having at least two hydroxy groups within each molecule by removal of the active hydrogen atoms, and said hydrophilic unit is obtainable from a modifier for hydrophilicity (c) having an active hydrogen atom and a hydrophilic moiety by removal of the active hydrogen atom.

19. A method of forming a multilayer coating film as in claim 10, wherein the number of repetitions of said carboduimide unit and polyol unit is 1 to 10.

20. A method of forming a multilayer coating film as in claim 10, wherein said carbodiimide unit is obtainable from a polycarbodiimide compound (a) having at least two isocyanato groups within each molecule by removal of the isocyanato groups, said polyol unit is obtainable from a polyol (b) having at least two hydroxy groups within each molecule by removal of the active hydrogen atoms, and said hydrophilic unit is obtainable from a modifier for hydrophilicity (c) having an active hydrogen atom and a hydrophilic moiety by removal of the active hydrogen atom.

* * * * *